Sept. 19, 1961  A. McKAY LARKIN  3,000,675
BEARING SEAL STRUCTURES
Filed Aug. 27, 1959
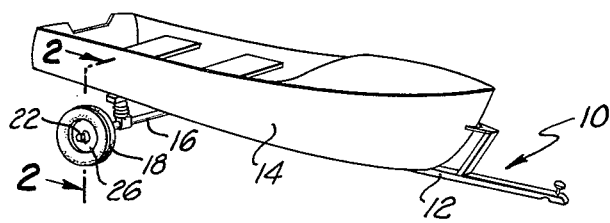
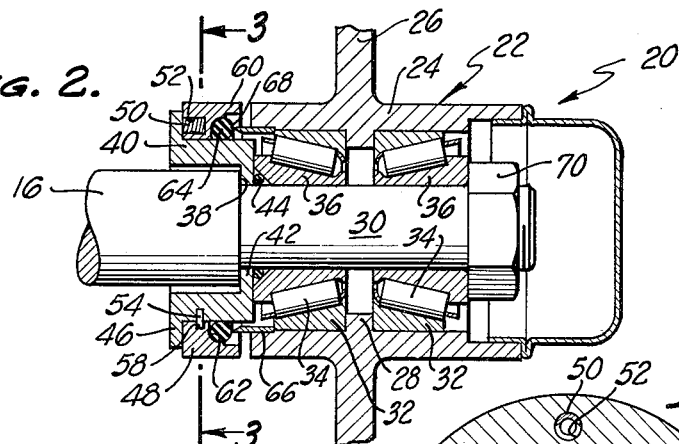
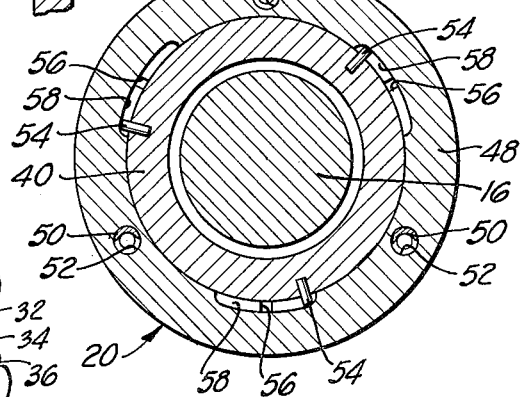
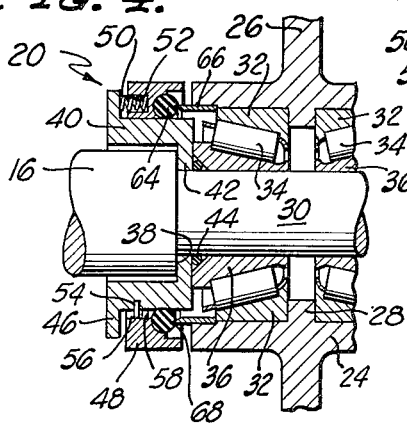
INVENTOR.
ARTEMAS McKAY LARKIN
BY
Edward D. O'Brien
ATTORNEY

United States Patent Office 3,000,675
Patented Sept. 19, 1961

3,000,675
BEARING SEAL STRUCTURES
Artemas McKay Larkin, 1368 Spazier Ave.,
Glendale, Calif.
Filed Aug. 27, 1959, Ser. No. 836,449
4 Claims. (Cl. 308—187.1)

This invention pertains to new and improved bearing seal structures.

On trailers and various other related types of vehicles the bearings used to rotatably support a wheel upon an axle can be a major source of trouble. This is particularly the case with common boat trailers. Such trailers are frequently immersed in either fresh or salt water in launching a boat or in placing a boat upon them. As the bearings in such trailers are presently used they tend to be severely damaged by contact with such water.

A broad object of the present invention is to provide bearing seal structures which may be easily and conveniently used so as to present such damage. Another related object of the present invention is to provide bearing seal structures which may be manufactured and installed upon known types of axles and bearing structures at a comparatively nominal expense and with a minimum amount of difficulty. A further object of the present invention is to provide sealing structures of this type which are very effective in their operation and which are easily used when required.

These and various other objects and advantages of this invention will be fully apparent from a detailed consideration of the remainder of this description including the appended claims and the accompanying drawing in which:

FIG. 1 is a perspective view of a boat trailer equipped with a bearing seal structure of this invention;

FIG. 2 is a cross-sectional view taken at line 2—2 of FIG. 1;

FIG. 3 is a cross-sectional view taken at line 3—3 of FIG. 2; and

FIG. 4 is a view similar to FIG. 2 showing the use of the bearing seal structure illustrated.

In all figures of the drawing like numerals are used to designate like parts. It is to be understood that the accompanying drawing is primarily intended so as to clearly illustrate a presently preferred embodiment or form of this invention. The basic features of the bearing seal structure illustrated can, however, be embodied in differently appearing structures through the use or exercise of routine engineering skill. These basic features or principles of this invention are defined or summarized in the appended claims forming a part of this disclosure.

As an aid to understanding the invention it may be stated in essentially summary form that it involves bearing seals used around an end of an axle in such a manner that the axle in itself in effect forms a part of such a bearing seal. Within a structure of this invention a collar is slidably mounted around an axle so as to hold an O-ring in such a manner that this O-ring may be brought into contact with an annular ridge located upon a hub of a wheel so as to form a seal therewith when it is desired to seal off from water or other damaging influences from a bearing located generally within this ridge between such a hub or wheel and such an axle.

The actual nature of this invention is best explained by referring directly to the accompanying drawing. In FIG. 1 there is shown a trailer 10 which includes a frame 12 adapted to support a boat 14 in an established manner. This frame 12 includes an axle 16 having two ends, each of which carries a wheel 18. It will be realized from a consideration of FIG. 1 of the drawing that only one of these wheels 18 is illustrated. A bearing seal structure 20 of this invention is used in connection with an end of the wheels 18.

Such a complete bearing seal structure 20 of this invention is shown in FIGS. 2 and 4 of the drawing. From an examination of FIG. 1 it will be realized that this structure 20 is located so as to include a part of the axle 16 and an interior part or hub 22 of the wheel 18. This hub 22 includes a cylinder 24 holding an external flange 26 forming a part of the wheel 18 proper. It also includes and internal flange 28 which extends from the cylinder 24 around a cylindrical extremity 30 of the axle 16. Against the interior of the cylinder 24 and against the flange 28 there are located within the hub 22 outer bearing races 32. These races, of conventional construction, bear against conventional bearing rollers 34 which in turn bear against conventional inner bearing races 36 positioned against and around the extremity 30. The axle 16 is separated from the extremity 30 of it by means of a shoulder 38 located adjacent to this inner race 36.

A retainer 40 having a cylindrical shape is fitted closely around the axle 16 so that an internal flange 42 on it bears against the shoulder 38 so as to separate the inner race 36 from this shoulder. Preferably, but not necessarily, an end of the inner race 36 is beveled around the extremity 30 so as to accommodate a conventional elastomeric O-ring 44 used in this location so as to form a seal between the flange 42 on the retainer 40 and the interior of the hub 22 containing the bearing structure previously described.

The end of the retainer 40 remote from the extremity 30 preferably includes an external flange 46. Around the exterior of the retainer 40 there is located an annular collar 48 in such a manner that this collar can be moved either toward or away from the extremity 30 and, of course, the external flange 46 and the other parts of the structure 20 described. Normally this collar 48 is urged toward the extremity 30 by means of a plurality of small springs 50, each of which is located so as to extend from a hole 52 in the collar 48 so as to bear against the external flange 46.

The collar 48 is adapted to be locked with respect to the retainer 40 and the axle 16 as shown in FIG. 2 so that these springs 50 are under compression through the use of pins 54. Each of these pins 54 extends from the exterior of the retainer 40 so as to be movable within slots 56 extending longitudinally with respect to the axis of the collar 48 within slots 58 connecting with the slots 56, the slots 58 extending around the interior of the collar 48. This type of pin and slot construction is best seen in FIGS. 3 and 4 of the drawing. When the collar 48 is being locked in place so as to hold the springs 50 under compression as shown in FIG. 2 the pins 54 are slid first within the slots 56 by movement of the collar 48 along the direction of its axis and then this collar 48 is locked in place by twisting it a slight amount, moving the slots 58 with respect to the pins 54.

The collar 48 includes an annular flange 60 defining between this collar and the retainer 40 an annular groove having a bottom wall 62 located within the collar 48 itself. This groove is adapted to hold a common elastomeric O-ring 64 so that this O-ring is open generally toward the extremity 30 of the axle 16. The cylinder 24 of the hub 22 contains an annular cylindrical sleeve 66 which may be pressed in place within it or otherwise similarly secured to it. This sleeve 66 includes a ridge 68 extending in an annular path around the extremity 30. As is best seen in FIGS. 2 and 4 of the drawing the ridge 68, although of a pointed character, has a rounded extremity or edge directly facing the O-ring 64 within the groove defined by the flange 60.

Within the structure described, the bearing races 32 and 36 and the rollers 34 are always held tightly together through the use of a nut 70 threaded upon the extremity 30 of the axle 16 in the established manner. The use of this nut 70 also holds the internal flange 42 of the retainer 40 against the shoulder 38 and causes the formation of a seal in the general area of the O-ring 44. The use of the nut 70 does create a static seal for the bearing structure described. Another seal is created with this invention by rotation of the collar 48 so as to cause the pins 54 to be disengaged from the slots 58 in order that they may slide within the slots 56. When the pins 54 are within the slots 56 the springs 50 urge the collar 48 toward the hub 22, causing the O-ring 64 to be moved so as to be engaged by the ridge 68 so as to form a seal completely around the axle 16, as indicated in FIG. 4.

This seal will prevent the entrance of water or the like generally within the hub 22 into the bearing races 32 and 36 and the rollers 34. Because of the fact that the collar 48, the O-ring 64 and the ridge 68 are all concentrically located with respect to the extremity 30 of the axle 16 rotation of the wheel 18 is permitted as may be required in launching a boat or in transporting a boat over comparatively minor distances without affecting this seal. Such rotation of the wheel 18 is, of course, accompanying by continuous relative movement between the O-ring 64 and the ridge 68. It has been found quite unexpectedly that such relative movement as may be encountered through nominal rotation of the wheel 18 does not detrimentally affect the O-ring 64 or the seal created with it.

After the structure 20 has been used in the manner indicated in the preceding so as to seal the bearing structure described, this structure may be easily taken out of use by simply moving the collar 48 against the spring 50 so as to cause the pins 54 to slide within the slots 56 until such time as these pins are opposite the slots 58. Then the collar 48 may be locked in place by merely twisting it.

When the collar 48 is moved in this manner to the position indicated in FIG. 2 the pressure tending to hold the O-ring 64 in contact with the ridge 68 is relieved and, hence, as the wheel 18 is turned contact of the O-ring 64 with the ridge 68 will tend to move the O-ring 64 away from this ridge.

When the collar 48 is moved to the position shown in FIG. 2 the effective water seal for the bearing structure described shown in FIG. 4 is, of course, broken. When the collar 48 is moved to the position shown in FIG. 2 the O-ring 64 will remain against the ridge 68 so as to exert a slight pressure against this ridge. This creates an effective dust shield when it is being employed as indicated in FIG. 2 and tends to keep dust and the like away from this bearing structure indicated.

Those skilled in the art will realize that bearing seal structures as herein described are very efficient, effective devices for the purpose intended. They will further realize that bearing seal structures as indicated in this specification may be easily and conveniently installed upon existing axle bearings and hub structures with only a comparatively nominal amount of work. They will also realize that these bearing seal structures may be used to seal a bearing supporting a wheel during the launching of a boat or the like whenever required with only a minimum of difficulty and they may be brought back into an inoperative position in as easy a manner. Because of the nature of this invention it is to be considered as being limited only by the appended claims forming a part of this disclosure.

I claim:

1. A bearing seal structure which includes: an axle having a cylindrical extremity, said axle including an annular shoulder extending around said extremity between said extremity and the remainder of said axle; a retainer positioned around said axle, said retainer including an internal flange engaging said shoulder and fitting around said extremity and an external flange positioned remote from said extremity; an annular collar positioned around said retainer, said collar being movable with respect to said retainer, said collar including a wall defining a groove located between said collar and the exterior of said retainer at the end of said collar adjacent to said extremity, said groove including a bottom wall formed in said collar; spring means engaging said collar and said external flange of said retainer, said spring means urging said collar toward said extremity of said axle; co-acting locking means formed on said collar and said retainer for holding said collar and said retainer with respect to one another with said spring means under compression; an elastomeric O-ring located within said groove between said collar and said retainer; bearing means mounted on said extremity against said internal flange of said retainer; wheel hub means located around said extremity of said axle so as to be carried by said bearing means; cylindrical sleeve means located around said extremity of said axle and mounted on said hub means, said sleeve means including a rounded edge located around said extremity within said groove adjacent to said O-ring, said edge exerting a slight pressure against said O-ring, said edge being contacted by said O-ring upon release of said locking means as a result of said spring means urging said collar toward said extremity of said axle and said sleeve means so as to form an effective water seal.

2. A bearing seal structure as defined in claim 1 wherein said bearing means includes an inner bearing race located around said extremity of said axle and an outer bearing race located within said wheel hub means and rollers located between said races, and including an elastomeric O-ring located between said internal flange of said retainer and said inner bearing race.

3. A bearing seal structure which includes: an axle having a cylindrical extremity, said axle including annular shoulder extending around said extremity between said extremity and the remainder of said axle; a retainer and collar assembly positioned around said axle, said retainer and collar assembly including an internal flange engaging said shoulder and a cylindrical groove extending around said axle, said groove opening toward said extremity of said axle and including a bottom wall; an elastomeric O-ring located within said groove; bearing means mounted on said extremity against said internal flange of said retainer and collar assembly; wheel hub means located around said extremity of said axle, said wheel hub means being carried by said bearing means; cylindrical sleeve means located around said extremity of said axle and mounted on said wheel hub means, said sleeve means including a rounded edge, said rounded edge extending into said groove and engaging said O-ring so as to form a seal therewith.

4. A bearing seal structure as defined in claim 3 wherein said bearing means includes an inner bearing race located around said extremity of said axle and an outer bearing race located within said wheel hub means, and rollers located between said races, and including an elastomeric O-ring located between said internal flange of said retainer and collar assembly and said inner bearing race.

References Cited in the file of this patent

UNITED STATES PATENTS

| | | |
|---|---|---|
| 1,947,017 | McHugh | Feb. 13, 1934 |
| 2,643,141 | Bryant | June 23, 1953 |
| 2,768,011 | Mosher | Oct. 23, 1956 |

UNITED STATES PATENT OFFICE
CERTIFICATE OF CORRECTION

Patent No. 3,000,675                                          September 19, 1961

Artemas McKay Larkin

It is hereby certified that error appears in the above numbered patent requiring correction and that the said Letters Patent should read as corrected below.

Column 1, line 20, for "present" read -- prevent --; column 2, line 10, for "and" read -- an --.

Signed and sealed this 3rd day of April 1962.

(SEAL)
Attest:

ERNEST W. SWIDER  
Attesting Officer

DAVID L. LADD  
Commissioner of Patents